United States Patent
Lindoff et al.

(10) Patent No.: US 8,223,825 B2
(45) Date of Patent: Jul. 17, 2012

(54) METHOD AND COMPUTER PROGRAM FOR ESTIMATING SIGNAL QUALITY VALUE, AND SIGNAL QUALITY ESTIMATOR, RECEIVER AND COMMUNICATION APPARATUS

(75) Inventors: Bengt Lindoff, Bjärred (SE); Leif Wilhelmsson, Dalby (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 82 days.

(21) Appl. No.: 12/866,604

(22) PCT Filed: Feb. 24, 2009

(86) PCT No.: PCT/EP2009/052142
§ 371 (c)(1),
(2), (4) Date: Nov. 1, 2010

(87) PCT Pub. No.: WO2009/106513
PCT Pub. Date: Sep. 3, 2009

(65) Prior Publication Data
US 2011/0045790 A1 Feb. 24, 2011

Related U.S. Application Data

(60) Provisional application No. 61/033,224, filed on Mar. 3, 2008.

(30) Foreign Application Priority Data

Feb. 26, 2008 (EP) ................................. 08102024

(51) Int. Cl.
*H04B 3/46* (2006.01)
*H04B 17/00* (2006.01)
*H04Q 1/20* (2006.01)

(52) U.S. Cl. ........................................ 375/224; 375/227
(58) Field of Classification Search .................. 375/224, 375/227, 229–236
See application file for complete search history.

(56) References Cited

U.S. PATENT DOCUMENTS
2004/0146023 A1* 7/2004 Pietraski et al. .............. 370/333

FOREIGN PATENT DOCUMENTS
JP 2007 208525 A 8/2007
WO 2006/122779 A 11/2006

OTHER PUBLICATIONS

PCT International Search Report, mailed May 14, 2009, in connection with International Application No. PCT/EP2009/052142.
PCT International Preliminary Report on Patentability, dated Apr. 28, 2010, in connection with International Application No. PCT/EP2009/052142.
Kuurne, A. M. J. Ed—Institute of Electrical and Electronics Engineers: "On GSM mobile measurement based interference matrix generation" IEEE 55th Conference on Vehicular Technology, Proceedings. Birmingham, AL, May 6-9, 2002. New York, NY, US, IEEE vol. 4, May 6, 2002, pp. 1965-1969, XP010622160, ISBN: 978-0-7803-7484-3.

* cited by examiner

*Primary Examiner* — Curtis Odom
(74) *Attorney, Agent, or Firm* — Potomac Patent Group PLLC

(57) ABSTRACT

A method of estimating a signal quality value in a receiver, the method comprising receiving a plurality of reference symbols; determining error rate for the plurality of received reference symbols; mapping the determined error rate to a signal quality value model; and determining mapped signal quality from the model to be signal quality value estimate. A signal quality estimator, a receiver, a communication apparatus, and a computer program for estimating signal quality are also disclosed.

39 Claims, 3 Drawing Sheets

000# METHOD AND COMPUTER PROGRAM FOR ESTIMATING SIGNAL QUALITY VALUE, AND SIGNAL QUALITY ESTIMATOR, RECEIVER AND COMMUNICATION APPARATUS

CROSS-REFERENCE TO RELATED APPLICATIONS

This application claims priority under 35 U.S.C. §119 to European Patent Application No. 08102024.0, filed Feb. 26, 2008, which is hereby incorporated herein by reference in its entirety. This application also claims the benefit of U.S. Provisional Application No. 61/033,224, filed Mar. 3, 2008, which is hereby incorporated herein by reference in its entirety.

TECHNICAL FIELD

The present invention relates to a method of estimating signal quality. The present invention also relates to a computer program for computerized implementation of the method. The present invention also relates to a signal quality estimator, a receiver having such a signal quality estimator, and a communication apparatus having such a receiver.

BACKGROUND

Signal quality values, e.g. signal-to-interference ratio (SIR), are often desired to be determined in wireless telecommunication apparatuses for supporting their operation. Typically, signal quality is estimated from reference signals, e.g. pilot signals, provided in the telecommunication system. The reference signal power can thus be divided by a total interference and thermal noise, and possibly corrected using some bias compensation. However, for very low signal quality, e.g. a SIR below −3 dB, the signal quality value estimate becomes highly biased and the accuracy of the estimate is questionable. The accuracy is needed, since in a typical application, a SIR of −5 dB could be sufficient to provide a desired quality of service, while for the same application, −7 dB would disable service provision. Providing a proper bias compensation at these levels is a difficult task. Therefore, there has been discovered a need for providing improved signal quality value estimation.

SUMMARY

The present invention is based on the understanding that an error rate, such as bit error rate or symbol error rate, is fairly simple to determine when reference symbols are present in a signal. The inventors have further realized that the error rate is indicative on channel quality, such as signal-to-interference ratio (SIR) and synchronization state, at least when considering knowledge of channel behavior, optionally also taking into account other channel parameters, such as Doppler spread or delay spread. It should be noted that determining synchronization state, i.e. whether the receiver is in or out of synchronization with a transmitter, could be used separately, in applications where SIR estimation is not an issue, but synchronization state is, and vice versa, or estimation of the two signal quality quantities can be used jointly.

According to a first aspect of the present invention, there is provided a method of estimating a signal quality value in a receiver. The method comprises receiving a plurality of reference symbols; determining error rate for the plurality of received reference symbols; mapping the determined error rate to a signal quality value model; and determining mapped signal quality from the model to be signal quality value estimate.

A particular advantage of this is a practical way of determining a signal quality value, especially when implemented in a modern computerized receiver. A further advantage that the inventors have found is that adequate signal quality values can be estimated at low signal qualities, which has until now showed to be a difficult task, with better accuracy such that reliability and quality of the transmission on the channel in question have been proven to be improved when relying on proper signal quality value estimations.

The method may further comprise selecting the signal quality value model based on at least one of Doppler spread, delay spread, and the number of reference symbols used to determine the error rate. The method may further comprise selecting a signal quality value model based on a Gaussian distribution function when Doppler spread is determined to be lower than a Doppler spread threshold. The method may further comprise selecting a signal quality value model based on a fading curve when Doppler spread is determined to be higher than the Doppler spread threshold.

An advantage of taking further parameters into account when selecting the signal quality value model to use have been found by the inventors to still give a reasonably low complex implementation with regard to the improvements on the quality of the SIR estimate, especially in harsh signal conditions.

The error rate may be bit error rate or symbol error rate. The signal quality value may comprise signal-to-interference ratio and/or a synchronization indicator indicating whether the receiver is in or out of synchronization. The method may further comprise selecting the synchronization indicator to indicate out of synchronization when error rate is above a threshold.

An advantage of this is that the approach is easily adapted to any purpose of signal quality value estimation, and is easily adapted to different needs of signal quality values.

The mapping may comprise looking up the determined error rate to a signal quality value look-up table; and determining mapped signal quality from the look-up table. The method may further comprise selecting the signal quality value look-up table based on at least one of Doppler spread, delay spread, and the number of reference symbols used to determine the error rate. The signal quality value look-up table may comprise at least a threshold value for error rate distinguishing whether the receiver is in or out of synchronization with the signal. The method may further comprise comparing the error rate with said threshold to determine synchronization state.

An advantage of taking further parameters into account when selecting the signal quality value model to use have been found by the inventors to still give a reasonably low complex implementation with regard to the improvements on the quality of the SIR estimate, especially in harsh signal conditions. The use of look-up tables will give a fast, flexible, and reliable provision of needed values.

The method may further comprise equalizing the received reference symbols prior to determining error rate. Thus, symbol or bit error is even easier to determine, since the equalized received reference signal can be compared with a fixed and/or standardized value. The equalizing may comprise estimating a channel on which the reference symbols are transmitted to achieve a channel estimate, and compensating the received reference symbols based on the channel estimate.

The method may further comprise filtering the error rate prior to mapping. This is beneficial for enabling a more reliable decision in the mapping procedure and/or making the decision less complex.

The method is also flexible in sense of applying statistical measures to further improve estimation. For example, the method may further comprise grouping received reference symbols; and coherently combining each group of received reference symbols, wherein the determined error rate is determined from at least one of said groups. The determined error rate may be determined from the error rate determined from the at least one of said groups and from an error rate determined from at least a non-grouped symbol. The error rate determined from the at least one of said groups and the error rate determined from at least a non-grouped symbol may be weighted according to their relative variance, respectively, for determining the error rate for the mapping. An advantage of any of these additional features is further improvement of accuracy and/or efficient implementation, e.g. in sense of processing requirements.

According to a second aspect of the present invention, there is provided a signal quality estimator comprising an input of a plurality of received reference symbols; an error rate estimator for the plurality reference symbols; an error rate to signal quality value mapper arranged to map the error rate to a signal quality value according to a signal quality model; and a signal quality estimator arranged to output a signal quality value estimate, which is to be the signal quality value from the signal quality model.

An advantage of the signal quality estimator is that error rate is neatly determined, and that signal quality values can be determined efficiently from the error rate. A further advantage of the signal quality estimator is that it is applicable in a wide range of devices having need for signal quality value estimation.

The error rate to signal quality value mapper may further be arranged to select the signal quality value model based on at least one of Doppler spread, delay spread, and the number of reference symbols used to determine the error rate. The error rate to signal quality value mapper may further be arranged to select a signal quality value model based on a Gaussian distribution function when Doppler spread is determined to be lower than a Doppler spread threshold. The error rate to signal quality value mapper may further be arranged to select a signal quality value model based on a fading curve when Doppler spread is determined to be higher than the Doppler spread threshold. Thus, the signal quality estimator can provide a further improved estimate, e.g. with higher accuracy for different signal situations.

The error rate may be bit error rate or symbol error rate. The signal quality value may comprise signal-to-interference ratio and/or a synchronization indicator indicating whether the receiver is in or out of synchronization. Thus, the signal quality estimator can be used for different signal schemes and output desired signal quality values.

The error rate to signal quality value mapper may further be arranged to select the synchronization indicator to indicate out of synchronization when error rate is above a threshold. This is a simple, but efficient way of gaining knowledge of synchronization state.

The error rate to signal quality value mapper may further be arranged to map the error rate to a signal quality value look-up table, and the signal quality estimator may further be arranged to determine signal quality value from the look-up table. The error rate to signal quality value mapper is further arranged to select the signal quality value look-up table based on at least one of Doppler spread, delay spread, and the number of reference symbols used to determine the error rate. This is an efficient way of gaining knowledge of signal quality values, especially for computerized implementation of the estimator. The signal quality value look-up table may comprise at least a threshold value for error rate distinguishing whether the receiver is in or out of synchronization with the signal. This enables adapted thresholds for different signal situations, implying enhanced estimation of synchronization state.

The signal quality estimator may further comprise an equalizer arranged to equalize the received reference symbols and arranged to feed equalized reference symbols to said error rate estimator. This provides for a further improved and efficient error rate determination.

The signal quality estimator may further comprise a channel estimator arranged to determine a channel estimate for the channel on which the reference symbols are transmitted, wherein the equalizer may be arranged to compensate the reference symbols based on the channel estimate.

The signal quality estimator may further comprise an error rate filter arranged to feed filtered error rate to the error rate to signal quality value mapper. This provides for further improved and efficient signal quality value to error rate mapping.

The error rate estimator may further be arranged to group received reference symbols, and coherently combine each group of received reference symbols, wherein the error rate is determined from at least one of said groups. The error rate estimator may further be arranged to determine the error rate. This error rate may be based on the error rate determined from the at least one of said groups and on an error rate determined from at least a non-grouped symbol. The error rate estimator may further be arranged to weight the error rate from the at least one of said groups and the error rate determined from at least a non-grouped symbol according to their relative variance, respectively, for determining the error rate. Any of these features provides for a more accurate error rate estimation.

According to a third aspect of the present invention, there is provided a receiver comprising a signal quality estimator according to the second aspect of the present invention. A receiver having such a signal quality estimator will gain similar advantages as demonstrated for the signal quality estimator according to the second aspect of the present invention, and will thus enable improved operation.

According to a fourth aspect of the present invention, there is provided a communication apparatus comprising a receiver according to the third aspect of the present invention. A communication apparatus having such a receiver will gain similar advantages as demonstrated for the signal quality estimator according to the second aspect of the present invention, and will thus enable improved operation.

According to a fifth aspect of the present invention, there is provided a computer program comprising instructions, which when executed by a processor are arranged to cause the processor to perform the method according to the first aspect of the present invention. A computer program implementing such a method will gain similar advantages as demonstrated for the signal quality estimation method according to the first aspect of the present invention, and will thus enable improved signal quality estimation for a computerized implementation.

DETAILED DESCRIPTION

Figure 1:
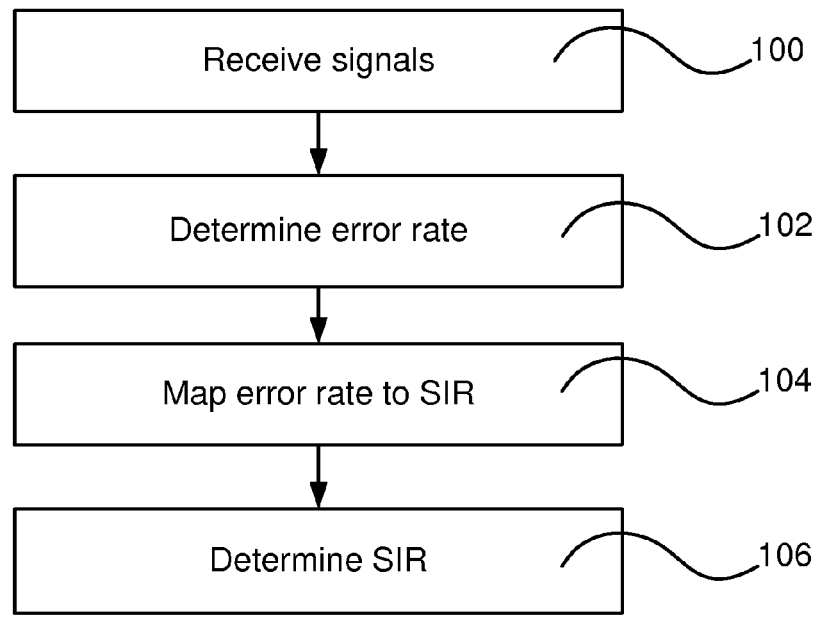
FIG. 1 is a flow chart illustrating a method of estimating signal-to-interference ratio according to an embodiment of the present invention.
Figure 2:
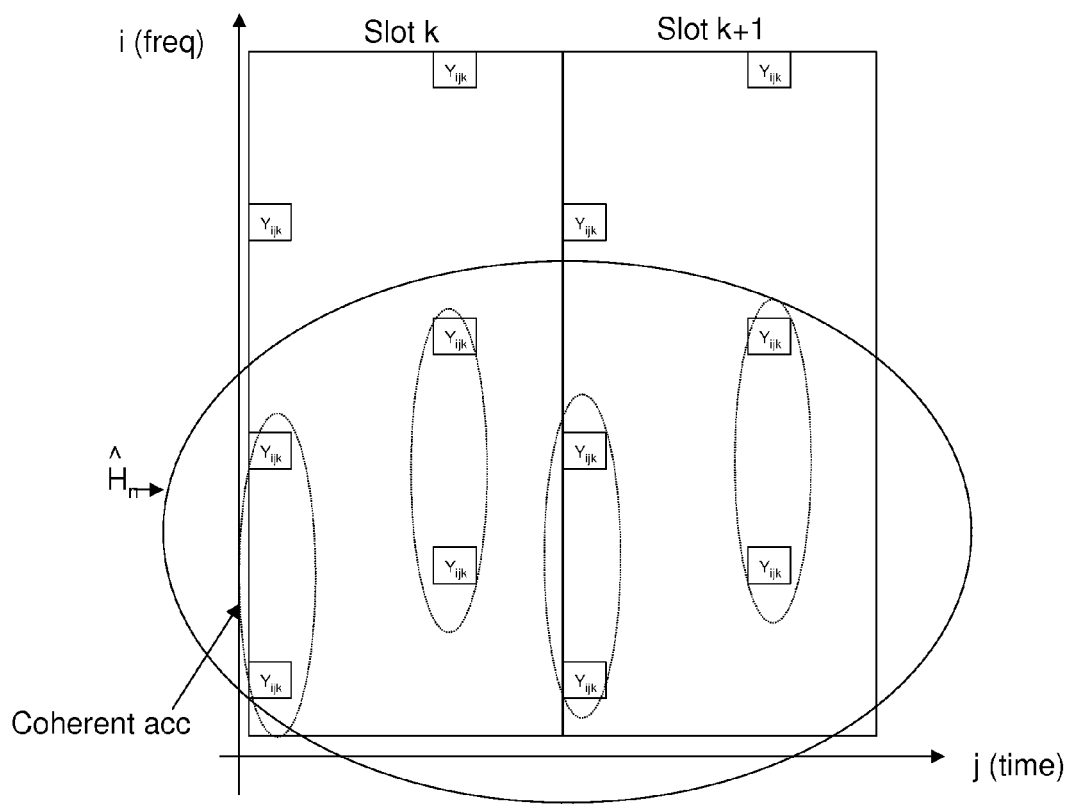
FIG. 2 is a time-frequency diagram illustrating reference symbols.

FIG. 1 is a flow chart illustrating a method of estimating signal-to-interference ratio in a receiver. In a reception step 100, the receiver receives a plurality of reference symbols, such as pilot symbols, or symbols in some training sequence. The properties of the reference symbols at least comprises that the symbols are known by the receiver. This enables an error determination step 102, where error rate for the plurality of received reference symbols is determined. This can be done by comparing each received symbol with what the symbol is known to be, or should have been. Still, all operations are low-complex, which provides for a fast, low-power, and reliable operation. For further improvement, the received reference symbols are equalized prior to determination of error rate. This is illustrated in FIG. 2, which illustrates coherent combined equalized reference symbols based on two equalized reference symbols. The coherent combining enables processing gain of observing how many of the receptions that are in the expected room of the signal space, here the first quadrant.

The received signal $y_{i,j,k}$ comprises a sum of noise and interference e and the transmitted reference symbol s influenced by the channel H, and can be described as $$y_{i,j,k} = Hs + e$$

FIG. 2 shows reference symbol pattern in Third Generation Partnership Project Long Term Evolution (3GPP LTE). Reference symbols are placed in a time-frequency grid on a sub-set of sub-carriers and a sub-set of orthogonal frequency-division multiplex (OFDM) symbols. A channel estimate number n can be determined, e.g. using 8 reference symbols, as $$\hat{H}_n = \frac{1}{8} \sum_{i,j,k} y_{i,j,k}$$

where $y_{i,j,k}$ is the received frequency domain symbol on sub-carrier i, symbol j in slot k. The channel estimate is updated as the channel changes, thus indexed with n. The update of the channel estimate can be performed periodically, for each set of reference symbols used (here 8), trigged by other parameters such as Doppler spread (indicating movement), signal level, etc., or be performed according to any other suitable scheme. The received reference symbols can then be equalized as $$D_{ijk} = \hat{H}_n^* y_{i,j,k}$$

Since the transmitted reference symbols are known to the receiver, an error rate can be determined by counting the number of symbols outside the first quadrant as $$p_1^m = \frac{1}{n} \sum_{i,j,k} (\operatorname{Re} D_{ijk} < 0) \text{ OR } (\operatorname{Im} D_{ijk} < 0)$$

for any symbol, or specifically for determining bit error rate for an exemplary quadrature phase shift key (QPSK) case $$p_1^m = \frac{1}{2n} \sum_{i,j,k} (\operatorname{Re} D_{ijk} < 0) + (\operatorname{Im} D_{ijk} < 0)$$

Similar relations can be derived for any signal configuration, e.g. higher order phase shift key, different signal patterns for quadrature amplitude modulation, etc.

In the example given, n=8. The procedure is preferably performed for all resource blocks and during a certain time interval. The error rate can then be filtered, e.g. averaged, to determine the final error rate as $$p_1 = \frac{1}{N} \sum_{m=1}^{N} p_1^m$$

Returning to FIG. 1, as the error rate is determined, it is mapped to a SIR model in a SIR mapping step 104. This means that from the determined error rate, an effort to say what SIR that would give that error rate is made. This is made by applying a model between SIR and error rate. Optionally, one of several models can be selected depending on other gained knowledge. Selection of a particular model further refines the mapping. The mapping, which can be of look-up character or by calculation, gives us a SIR that is determined to be our SIR estimate in a SIR estimate determination step 106.

The selection of the SIR model can be based on Doppler spread, delay spread, and/or the number of reference symbols used to determine the error rate. For example, a SIR model based on a Gaussian distribution function can preferably be selected when low Doppler spread is determined, e.g. when determined to be lower than a Doppler spread threshold. The relation between SIR and error rate can thus be $$SIR = (\Phi^{-1}(1-p))^2$$

for the bit error rate case, where $\Phi$ is the normalized Gaussian distribution and p is the bit error rate.

When Doppler spread is determined to be high, e.g. higher than the Doppler spread threshold, a SIR model based on a fading curve is used. This is based on the relation $$p = \frac{1}{2}\left[1 - \sqrt{\frac{2SIR}{1 + 2SIR}}\right]$$

i.e. the error rate p follows the fading curve, which gives us $$SIR = \frac{(1-2p)^2}{8p(1-p)}$$

for the bit error rate case.

The relation between bit error rate and symbol error rate for higher order symbols is known to be derivable for the higher order signal scheme, and exemplary equations given above for bit error rate can be applied accordingly. For example, the relation between symbol error rate for quadrature phase-shift keying (QPSK) $P_s$ and corresponding bit error rate $P_b$ is as $$P_s = 2P_b - P_b^2$$

The method can also be used to detect whether the receiver is in or out of synchronization with a transmitter. This is naturally distinguishable from effects of low SIR, since this gives an error rate that is essentially higher. Thus, an out of synchronization state can be determined to be present when symbol error rate is above a threshold, the detecting comprising mapping the determined error rate to a synchronization state look-up table; and determining mapped synchronization state from the look-up table to be indicative whether the receiver is in or out of synchronization with the signal. The synchronization state can be given by a synchronization indicator indicating whether the receiver is in or out of synchronization. These states determines if the link has sufficient quality, i.e. in synchronization, or if the link does not have sufficient quality, i.e. out of synchronization. The look-up table can be selected based on at least one of Doppler spread, delay spread, and the number of reference symbols used to determine the symbol error rate. The look-up table preferably comprises threshold values for symbol error rates that are used to detect the synchronization state. Thus, also out-of-synchronization can be determined with a similar mechanism.

Figure 4:
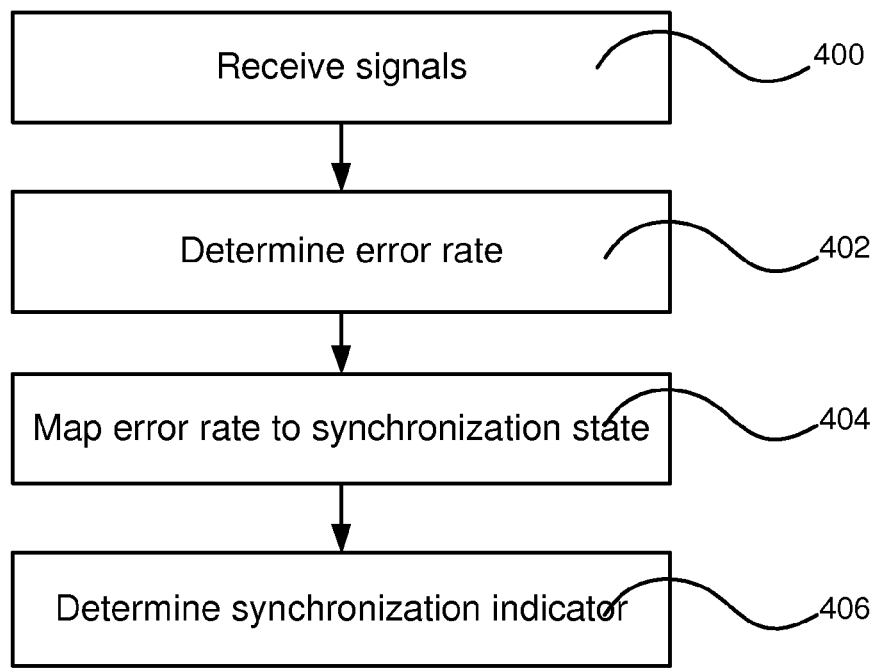
FIG. 4 is a flow chart illustrating a method of estimating synchronization state according to an embodiment of the present invention.

FIG. 4 is a flow chart illustrating a method of estimating synchronization state in a receiver. In a reception step 400, the receiver receives a plurality of reference symbols, such as pilot symbols, or symbols in some training sequence. The properties of the reference symbols at least comprises that the symbols are known by the receiver. This enables an error determination step 402, where error rate for the plurality of received reference symbols is determined. This can be done by comparing each received symbol with what the symbol is known to be, or should have been. As the error rate is determined, the error rate is mapped to a synchronization state model in a synchronization state mapping step 404. This means that from the determined error rate, an effort to say what synchronization state that would give that error rate is made. This is made by applying a model between synchronization state and error rate. For example, the synchronization indicator can be selected to indicate out of synchronization when error rate is above a threshold. The threshold is preferably chosen upon statistics or experience from the communication system which the invention is applied to. The selection can be a plain comparison, or a table-look-up in a look-up table. The table can comprise metrics for probability for being in or out of synchronization, which metrics may be used by other elements of the receiver for further processing. Optionally, one of several models can be selected depending on other gained knowledge. Selection of a particular model further refines the mapping. The mapping, which can be of look-up character or by calculation, gives us a synchronization indicator that is determined to be our synchronization state estimate in a synchronization indicator estimate determination step 406. Synchronization state can be in or out of synchronization, or a metric representing probability for being in or out of synchronization, and can be represented by the synchronization indicator.

Figure 5:
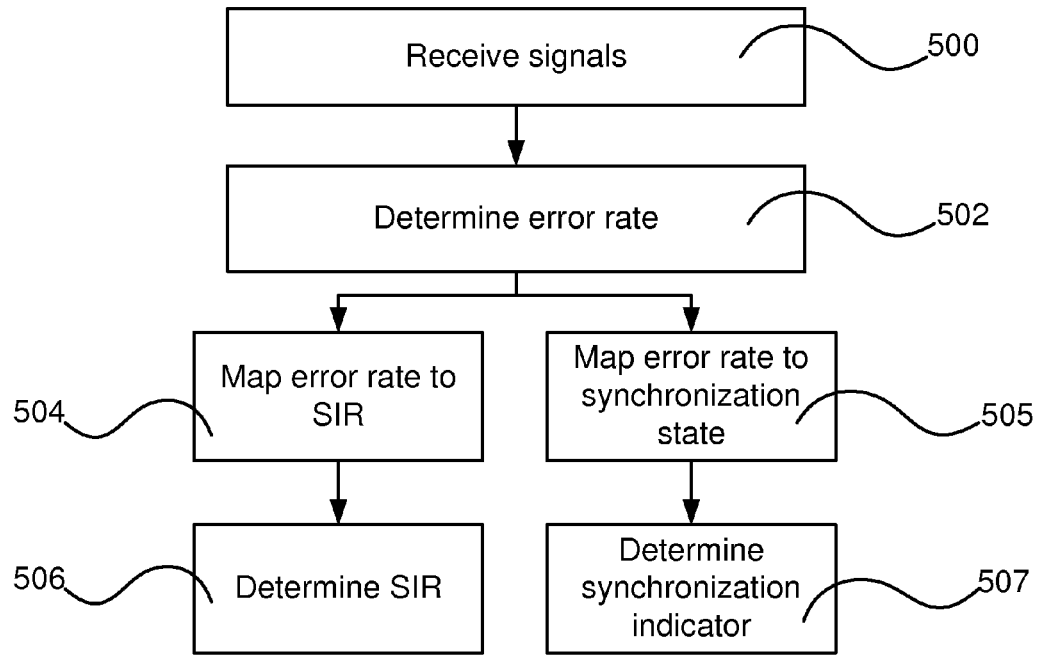
FIG. 5 is a flow chart illustrating a method of joint estimating signal-to-interference ratio and synchronization state according to an embodiment of the present invention.

The embodiments of the methods demonstrated with reference to FIGS. 1 and 4 can be used separately, or jointly, as roughly illustrated in FIG. 5. In a joint reception step 500, the receiver receives a plurality of reference symbols. In a joint error determination step 502, error rate for the plurality of received reference symbols is determined. From the determined error rate, SIR is mapped in a SIR mapping step 504, and synchronization state is mapped in a synchronization state mapping step 505. SIR is then determined in a SIR determination step 506, and a synchronization indicator is determined in a synchronization indicator determination step 507. The actions 500-507 have similar properties, alternatives, and features as the actions 100-106 and 400-406, which have been described in detail with reference to FIGS. 1 and 4.

Figure 3:
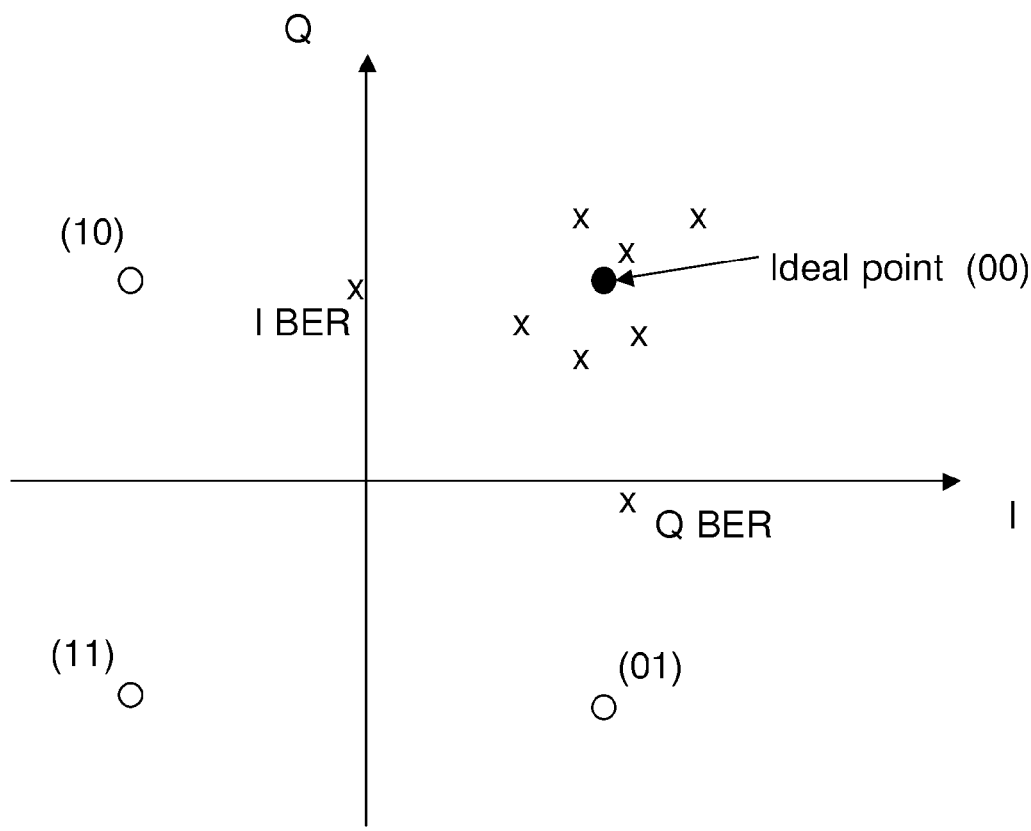
FIG. 3 illustrates coherent combined equalized reference symbols.

It should be noted that a symbol for determining the error rate can be based on a bit or higher order symbol. In these cases the "error rate" becomes the "bit error rate" or "symbol error rate", whichever is preferable for implementations in certain receivers, e.g. where the bit error rate or symbol error rate is a parameter that is determined and used also for other purposes. The implementation can also include equalizing symbols prior to determining symbol error rate to make symbol or bit error even easier to determine, as demonstrated above with reference to FIG. 3, since the equalized received reference signal can be compared with a fixed and/or standardized value. The determined symbol error rate can, as also demonstrated above, be further processed prior to mapping, e.g. by filtering. A significant improvement in accuracy can be provided by using statistical measures to further improve estimation. For example, by grouping received reference symbols and coherently combining each group of received reference symbols, and then determine a second symbol error rate $p_2$ (the symbol error rate determined from a single symbol, denoted p above, will now be denoted $p_1$) from the grouped symbols. For example, forming coherent combined equalized reference symbols based on two equalized reference symbols, as illustrated in FIG. 2, will give us $$D_{\cdot jk} = \sum_i D_{ijk}$$

where $D_{\cdot jk}$ has a signal strength twice of $D_{ijk}$, i.e. a gain of 3 dB.

We can compute the bit error rate for the coherently combined reference symbols (in this example bits) as $$p_2^m = \frac{1}{n} \sum_{j,k} (\operatorname{Re} D_{\cdot jk} < 0) + (\operatorname{Im} D_{\cdot jk} < 0)$$

In the example illustrated in FIG. 2, n=8. This procedure can be performed over all resource blocks, and also over a certain time interval. By filtering the achieved bit error rate, e.g. averaging, the bit error rate is determined as $$p_2 = \frac{1}{N} \sum_{m=1}^{N} p_2^m$$

The determined bit error rate can be determined from the bit error rate $p_2$. The bit error rate $p_2$ is determined from the at least one of said groups and from a bit error rate determined from at least a non-grouped symbol $p_1$. Since $p_1$ is based on a larger number of observations than $p_2$, $p_1$ and $p_2$ have different variance, since $$Var(p_i) \sim p_i(1-p_i)/N$$

which for a low Doppler spread can give $$SIR_2 = \frac{(\Phi^{-1}(1-p_2))^2}{2}$$

since the decision variable used to determine $p_2$ is operating on twice the SIR relative the decision variable used to determine $p_1$.

The symbol error rate determined from the at least one of said groups and the symbol error rate determined from at least a non-grouped symbol can be weighted according to their relative variance, respectively, for determining the symbol error rate for the mapping. Thus, the symbol error rate to be used for mapping can be $$SIR_{final} = \alpha SIR_1 + (1-\alpha) SIR_2$$

where $\alpha$ is a value between 0 and 1 and depends on the relative variance between $p_1$ and $p_2$.

Determination of synchronization status can be made from symbol error rates $p_1$ and $p_2$. It can be assumed that in-synchronization or out-of-synchronization are defined when both $p_1$ and $p_2$ are below and above thresholds $th_1$, $th_2$, respectively. If any of the symbol error rates is above its threshold, and the other symbol error rate is below its threshold, the synchronization state is preferably determined to be unchanged since last determination. For further refinement of determination of synchronization state, the symbol error rates can be associated with more than one threshold to be compared with. The threshold(s) are preferably arranged in a look-up table for simplified and fast check.

The similar principle can be utilized for providing further $p_k$ ($k=3, 4, \ldots$) as long as further symbols are available. These $p_k$ can be averaged in a similar way as demonstrated for $p_1$, $p_2$ above. Thus, further bit error rates can be determined and mapped to $SIR_k$, respectively. The determined $SIR_k$ values can then be used for linear combination of a further refined final SIR.

Figure 6:
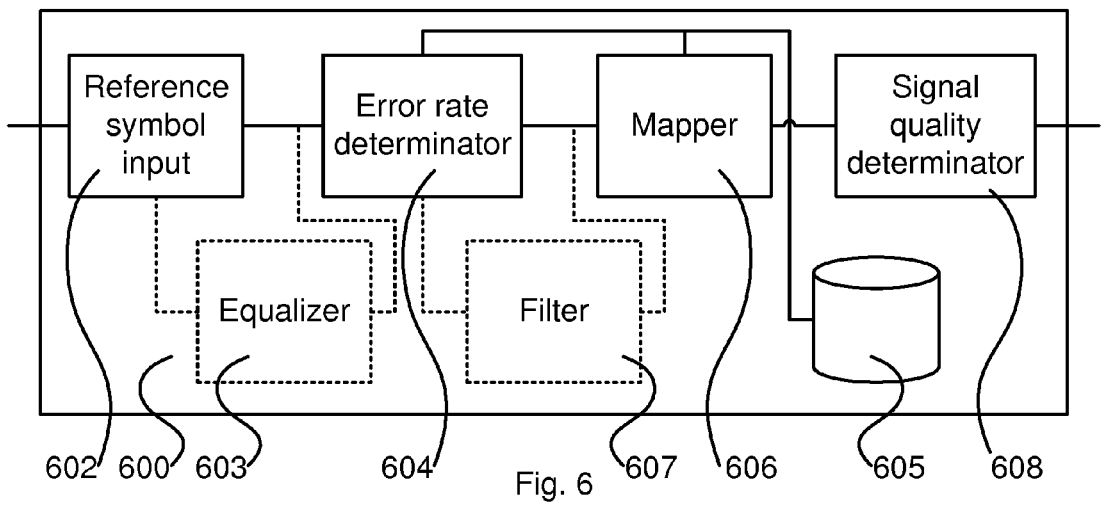
FIG. 6 is a block diagram schematically illustrating an estimator.

FIG. 6 illustrates a signal quality estimator 600 comprising an input 602 of a plurality of received reference symbols. The received reference symbols can be a subset of symbols received by a receiver, e.g. wirelessly via an antenna from a remote transmitter, e.g. a base station in a cellular communication network. An error rate estimator 604 determines error rate for the plurality reference symbols, which is possible since the information of the reference symbols are known. An error rate to signal quality value mapper 606 is arranged to map the error rate to a signal quality value according to a signal quality model. The model can be one or more, wherein a plurality of models enables a wise selection of applicable model for a current signal situation. A signal quality estimator/determinator 608 is arranged to output a signal quality value estimate, which is the result of the signal quality value from the use of the signal quality model. The signal quality model can be collected from a mapping database 605. The error rate to signal quality value mapper 604 can be arranged to select the signal quality value model based on at least one of Doppler spread, delay spread, and the number of reference symbols used to determine the error rate, and the desired model is collected from the mapping database 605. The error rate to signal quality value mapper 604 can for example be arranged to select a signal quality value model based on a Gaussian distribution function when Doppler spread is determined to be lower than a Doppler spread threshold, or a signal quality value model based on a fading curve when Doppler spread is determined to be higher than the Doppler spread threshold.

The error rate is bit error rate, or symbol error rate. The signal quality value can comprise signal-to-interference ratio and/or a synchronization indicator indicating whether the receiver is in or out of synchronization. The error rate to signal quality value mapper 606 can for example be arranged to select the synchronization indicator to indicate out of synchronization when error rate is above a threshold. The error rate to signal quality value mapper 606 can be arranged to map the determined error rate to a signal quality look-up table, and the signal quality estimator/determinator 608 is further arranged to determine signal quality from the look-up table. The look-up table can be stored in the mapping database 605. The error rate to signal quality value mapper 606 can also be arranged to select the look-up table based on at least one of Doppler spread, frequency selectivity, and the number of reference symbols used to determine the error rate. The look-up table can comprise a threshold value for error rate distinguishing whether the receiver is in or out of synchronization with the signal. The threshold can depend on different criteria, such as used signal scheme, mode of communication, signal rate, etc. and is therefore stored accordingly in the look-up table.

The estimator can comprise an equalizer 603 arranged to equalize the received reference symbols and arranged to feed equalized reference symbols to said error rate estimator/determinator 604. Equalizing can be performed as demonstrated with reference to FIGS. 2 and 3 above.

The estimator can comprise an error rate filter 607 arranged to feed filtered error rate to the error rate to signal quality value mapper 606. Filtering, e.g. averaging, can improve reliable mapping, and can be selectable.

The error rate estimator/determinator 604 can also be arranged to group received reference symbols, and coherently combine each group of received reference symbols, wherein the determined error rate is determined from at least one of said groups. This has been discussed in detail with reference to FIG. 2 above. The error rate estimator/determinator 604 can determine the determined error rate from the error rate determined from the at least one of said groups and from an error rate determined from at least a non-grouped symbol. The error rate can thus be determined from at least a non-grouped symbol according to their relative variance, respectively, for determining the error rate. This can then be performed iteratively to gradually increase quality of the determined error rate to a desired level.

Figure 8:
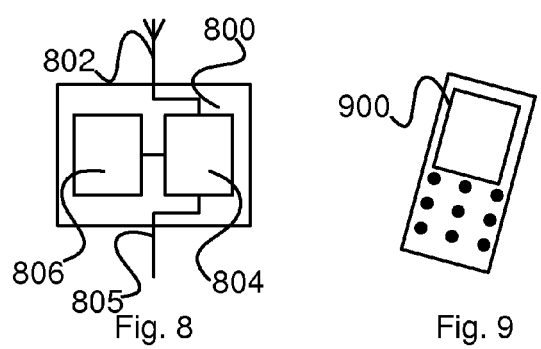
FIG. 8 is a block diagram schematically illustrating a receiver according to an embodiment of the present invention.

The signal quality estimator can be used in a receiver comprising the signal quality estimator. FIG. 8 illustrates an exemplary receiver 800, having an antenna 802 for receiving radio signals from a remote transmitter (not shown). Signals from the antenna 802 is processed in a receiver circuitry 804 to output a decoded and/or demodulated signal at an output 805 of the receiver 800. The receiver circuitry 804 provides received reference symbols to a signal quality estimator 806, which have features according to any of the embodiments demonstrated with reference to FIG. 6, and provides signal quality value estimates that can be used by the receiver circuitry 804, or be provided at the output 805 of the receiver 800. The receiver 800 can be used in a communication apparatus comprising the receiver 800.

Figure 9:
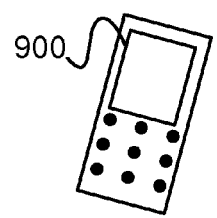
FIG. 9 illustrates an exemplary communication apparatus according to an embodiment of the invention.

FIG. 9 illustrates an exemplary communication apparatus 900 having a receiver like the one demonstrated with reference to FIG. 8. The communication apparatus 900 can for example be a mobile phone for use in a cellular communication network, e.g. a GSM, GPRS, EDGE, UMTS and/or 3GPP LTE enabled network, where the mobile phone has ability to communicate via one or more of these standards. The communication apparatus 900 can also be a network node, a relay station, a communication part in a computer, a radio modem, or other apparatus having a receiver and having need for signal quality estimation.

Figure 7:
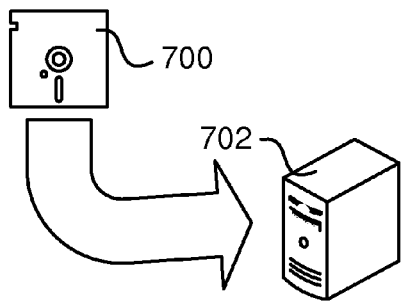
FIG. 7 schematically illustrates a computer readable medium for a computer program for implementing embodiments of the invention.

FIG. 7 is a schematic illustration of a computer readable medium according to an embodiment of the present invention. The method is implementable with aid of hardware in an apparatus, and preferable with aid of software. Thus, the signal quality estimation function is suitable for implementation with aid of processing means, such as general, signal, and/or image processors. The computer program preferably comprises program code, as illustrated in FIG. 7, which is stored on a computer readable medium 700, which can be loaded and executed by a processing means 702 to cause it to perform the above described method comprising stimating a signal quality value by receiving a plurality of reference symbols; determining error rate for the plurality of received reference symbols; mapping the determined error rate to a signal quality value model; and determining mapped signal quality from the model to be signal quality value estimate. The actions described with reference to any of FIGS. 1, 4, and 5 are particularly suitable for direct implementation by means of computer instructions, and for the sake of conciseness, reference is made to the description of these actions above.

The processing means 702 and computer program product 700 can be arranged to execute the program code sequentially where actions are performed stepwise, but mostly be arranged to execute the program code on a real-time basis where actions are performed upon need and availability of data. The processing means 702 is preferably what normally is referred to as an embedded system. Thus, the depicted computer readable medium 700 and processing means 702 in FIG. 7 should be construed to be for illustrative purposes only to provide understanding of the principle, and not to be construed as any direct illustration of the elements.

The invention claimed is:

1. A method of estimating a signal quality value in a receiver, the method comprising:
   receiving a plurality of reference symbols;
   grouping received reference symbols into a plurality of groups;
   coherently combining each group of received reference symbols;
   determining error rate for the plurality of received reference symbols, wherein the determined error rate is determined from said groups;
   mapping the determined error rate to a signal quality value model; and
   determining mapped signal quality from the model to be signal quality value estimate.

2. The method according to claim 1, further comprising selecting the signal quality value model based on at least one of Doppler spread, delay spread, and the number of reference symbols used to determine the error rate.

3. The method according to claim 2, further comprising:
   selecting a signal quality value model based on a Gaussian distribution function when Doppler spread is determined to be lower than a Doppler spread threshold.

4. The method according to claim 2, further comprising:
   selecting a signal quality value model based on a fading curve when Doppler spread is determined to be higher than the Doppler spread threshold.

5. The method according to claim 1, wherein the error rate is bit error rate.

6. The method according to claim 1, wherein the error rate comprises symbol error rate.

7. The method according to claim 1, wherein the signal quality value comprises signal-to-interference ratio.

8. The method according to claim 1, wherein the signal quality value comprises a synchronization indicator indicating whether the receiver is in or out of synchronization.

9. The method according to claim 8, further comprising:
   selecting the synchronization indicator to indicate out of synchronization when error rate is above a threshold.

10. The method according to claim 1, wherein the mapping comprises:
    looking up the determined error rate to a signal quality value look-up table; and
    determining mapped signal quality from the look-up table.

11. The method according to claim 10, further comprising selecting the signal quality value look-up table based on at least one of Doppler spread, delay spread, and the number of reference symbols used to determine the error rate.

12. The method according to claim 10, wherein the signal quality value look-up table comprises at least a threshold value for error rate distinguishing whether the receiver is in or out of synchronization with the signal, the method further comprising comparing the error rate with said threshold to determine synchronization state.

13. The method according to claim 1, further comprising equalizing the received reference symbols prior to determining error rate.

14. The method according to claim 13, wherein equalizing comprises:
    estimating a channel on which the reference symbols are transmitted to achieve a channel estimate; and
    compensating the received reference symbols based on the channel estimate.

15. The method according to claim 1, further comprising filtering the error rate prior to mapping.

16. The method according to claim 1, wherein the determined error rate is determined from the error rate determined from the said groups of received symbols and from an error rate determined from groups of coherent combined equalized reference symbols formed from grouped received reference symbols.

17. The method according to claim 1, wherein the determined error rate is determined from the error rate determined from the at least one of said groups and from an error rate determined from at least a non-grouped symbol.

18. The method according to claim 17, wherein the error rate determined from the at least one of said groups and the error rate determined from at least a non-grouped symbol are weighted according to their relative variance, respectively, for determining the error rate for the mapping.

19. A signal quality estimator comprising:
    an input of a plurality of received reference symbols;
    an error rate estimator for the plurality of received reference symbols, wherein the error rate estimator is arranged to group received reference symbols into a plurality of groups, and coherently combine each group of received reference symbols, wherein the error rate is determined from said groups;

an error rate to signal quality value mapper arranged to map the error rate to a signal quality value according to a signal quality model; and a signal quality estimator arranged to output a signal quality value estimate, which is to be the signal quality value from the signal quality model.

20. The signal quality estimator according to claim 19, wherein the error rate to signal quality value mapper is further arranged to select the signal quality value model based on at least one of Doppler spread, delay spread, and the number of reference symbols used to determine the error rate.

21. The signal quality estimator according to claim 20, wherein the error rate to signal quality value mapper is further arranged to select a signal quality value model based on a Gaussian distribution function when Doppler spread is determined to be lower than a Doppler spread threshold.

22. The signal quality estimator according to claim 20, wherein the error rate to signal quality value mapper is further arranged to select a signal quality value model based on a fading curve when Doppler spread is determined to be higher than the Doppler spread threshold.

23. The signal quality estimator according to claim 19, wherein the error rate is bit error rate.

24. The signal quality estimator according to claim 19, wherein the error rate is symbol error rate.

25. The signal quality estimator according to claim 19, wherein the signal quality value comprises signal-to-interference ratio.

26. The signal quality estimator according to claim 19, wherein the signal quality value comprises a synchronization indicator indicating whether the receiver is in or out of synchronization.

27. The signal quality estimator according to claim 26, wherein the error rate to signal quality value mapper is further arranged to select the synchronization indicator to indicate out of synchronization when error rate is above a threshold.

28. The signal quality estimator according to claim 19, wherein the error rate to signal quality value mapper is further arranged to map the determined error rate to a signal quality value look-up table, and the signal quality estimator is further arranged to determine signal quality value from the look-up table.

29. The signal quality estimator according to claim 28, wherein the error rate to signal quality value mapper is further arranged to select the signal quality value look-up table based on at least one of Doppler spread, delay spread, and the number of reference symbols used to determine the error rate.

30. The signal quality estimator according to claim 28, wherein the signal quality value look-up table comprises at least a threshold value for error rate distinguishing whether the receiver is in or out of synchronization with the signal.

31. The signal quality estimator according to claim 19, further comprising an equalizer arranged to equalize the received reference symbols and arranged to feed equalized reference symbols to said error rate estimator.

32. The signal quality estimator according to claim 31, further comprising a channel estimator arranged to determine a channel estimate for the channel on which the reference symbols are transmitted, wherein the equalizer is arranged to compensate the reference symbols based on the channel estimate.

33. The signal quality estimator according to claim 19, further comprising an error rate filter arranged to feed filtered error rate to the error rate to signal quality value mapper.

34. The signal quality estimator according to claim 19, wherein the determined error rate is determined from the error rate determined from the said groups of received symbols and from an error rate determined from groups of coherent combined equalized reference symbols formed from grouped received reference symbols.

35. The signal quality estimator according to claim 19, wherein the error rate estimator further is arranged to determine the error rate from the error rate determined from the at least one of said groups and from an error rate determined from at least a non-grouped symbol.

36. The signal quality estimator according to claim 35, wherein the error rate estimator further is arranged to weight the error rate from the at least one of said groups and the error rate determined from at least a non-grouped symbol according to their relative variance, respectively, for determining the error rate.

37. A receiver comprising a signal quality estimator according to claim 19.

38. A communication apparatus comprising a receiver according to claim 37.

39. A nontransitory computer-readable storage medium having stored therein a computer program comprising instructions, which when executed by a processor are arranged to cause the processor to perform a method wherein the method is for estimating a signal quality value in a receiver, the method comprising:

receiving a plurality of reference symbols;

grouping received reference symbols into a plurality of groups;

coherently combining each group of received reference symbols;

determining error rate for the plurality of received reference symbols, wherein the determined error rate is determined from said groups;

mapping the determined error rate to a signal quality value model; and determining mapped signal quality from the model to be signal quality value estimate.

* * * * *